United States Patent [19]

Vandnais et al.

[11] Patent Number: 4,942,658
[45] Date of Patent: Jul. 24, 1990

[54] METHOD FOR MANUFACTURING A MAGNETIC HEAD CORE WITH A FLUX GAP HAVING A PRECISELY CONTROLLED LENGTH

[75] Inventors: Timothy W. Vandnais, Victoria; Judy M. Ekern, Edina; Douglas J. Hennenfent, Minneapolis, all of Minn.

[73] Assignee: Magnetic Peripherals Inc., Minnetonka, Minn.

[21] Appl. No.: 277,737

[22] Filed: Nov. 30, 1988

[51] Int. Cl.$^5$ .............................................. G11B 5/42
[52] U.S. Cl. ...................................... 29/603; 360/120; 360/127
[58] Field of Search .................. 29/603; 360/119–121, 360/125, 126, 127

[56] References Cited

U.S. PATENT DOCUMENTS 3,605,258  9/1971  Fisher et al. ............................ 29/603
4,670,972  6/1987  Sakakima .............................. 29/603

Primary Examiner—Carl E. Hall
Attorney, Agent, or Firm—Edward P. Heller, III

[57] ABSTRACT

A process for assembling the I core and C core element of a ferrite magnetic transducer core includes the steps of depositing by sputtering a gap material on the gap face of one core element. A magnetic material of the type which can be bonded to ferrite by heat and pressure is then sputter deposited on the gap material. The surface of the magnetic material is then juxtaposed to the gap face of the other element and heat and pressure below a pint which may affect the ferrite's magnetic characteristics is used to diffusion bond the two elements to each other. It is possible to use a layer of Sendust Fe-Si-Al high permeability alloy or other high permeability material as the magnetic material deposited on the gap material if this enhancement of the core is desired. In any case, higher than customary clamping pressure along with lower than customary temperature is used to effect the bond.

7 Claims, 3 Drawing Sheets

OPERATINGS FOR BONDING DIFFERENT MATERIALS TO FERRITE

METHOD FOR MANUFACTURING A MAGNETIC HEAD CORE WITH A FLUX GAP HAVING A PRECISELY CONTROLLED LENGTH

BACKGROUND/INFORMATION DISCLOSURE STATEMENT

In the various types of data recording systems based on use of a magnetic medium, a magnetic transducer head is used to create the magnetic patterns in the medium and to read back the data after recording it. The typical magnetic head has an 0-shaped core element which provides a magnetic flux path including a flux gap across which flux fringing occurs. During reading and writing, the flux gap is placed in close proximity with the medium, and the medium is moved with respect to the gap. The fringing flux during writing enters the medium, causing the magnetic patterns to be created therein. The flux flow for the writing process is created by a winding through which the flux path passes.

During reading, the medium is again moved relative to the gap, and the magnetic pattern in the medium causes flow of flux in the flux path, which flux flow recreates the magnetic pattern in the medium. By detecting, i.e. converting it to an electrical signal, this flux flow can be converted into the original data. During reading, voltage across this same winding can be used to detect the flux flow, or a separate flux-detecting element such as a magneto-resistive element can be used.

There are two types of magnetic recording heads now in general use. The older type has a ferrite or other core providing the flux path and a separate wire winding for writing and reading. The newer is formed by photolithographic processes and is typically referred to as a thin film recording head. The invention forming the subject matter here is concerned with the ferrite core type of recording head.

The complete O core of a ferrite core head typically comprises a C core element, so called because it is in the shape of a C, and an I core element having an elongated rectangle shape. The I core and C core elements are attached to each other in some manner with the I core element connecting the arms of the C core element to thereby close the flux path. One of the connecting points between these two elements forms the flux gap. Typically, the flux gap is formed of a hard non-magnetic material such as glass or alumina. The two facing surfaces of the I core and the C core which define the flux gap are called the gap faces.

In most applications and certainly for disk drives for digital storage of data, it is very desirable to make the width of the flux gap (dimension of the gap faces which is adjacent the medium and parallel to the medium surface) very small so that the magnetic patterns created by writing are confined to a very narrow track. By reducing the gap width to 0.001 in. (0.025 mm.) or less for example, it is possible to space tracks of data on a disk so that 1000 or more are packed in a radius of one inch. It is preferred to closely pack these tracks so as to increase the amount of data which a single disk drive unit can store, thereby increasing the compactness of the drive itself for a given data capacity. It also turns out that in general by increasing the capacity of a disk drive by increasing the density of data storage on the individual disks as technical advances allow, one can on a cost per bit basis store data more cheaply than is possible by simply increasing the number of disk drives in an installation.

To make the individual cores used for the heads, a C bar element whose cross section is uniformly identical to that of an individual C core element, is bonded to an I bar element whose cross section is the same as that of the individual I core elements. Usually the I and C bars are from 50 to 100 times as long as the finished core width, with the gap width substantially smaller than the core width. A thin layer of gap material is placed, now usually by a sputtering process, at the interface corresponding to the gap of the finished cores. The I bar is then clamped to the C bar to close its ends, in combination with it assuming the shape of an O bar. The I bar/C bar assembly is then heated to a temperature sufficient to fuse the gap material to the adjacent I and C bar gap faces, fixing the gap length and bonding the bars to each other in the O bar shape. The assembled bar resulting is then sawed transversely into individual cores which can be wound and mounted in a suitable support. For use in rigid disk drives, these cores are mounted in slots in hard ceramic sliders which are designed to aerodynamically fly in close proximity to the disk surfaces.

The trend is to smaller gap lengths. (Length of the flux gap refers to the dimension in the direction of the flux flow in the core adjacent the gap, and is essentially the thickness of the gap material.) By making the gap length very small, it is possible to write and read individual flux pattern changes which are packed very closely together, increasing the amount of data which can be stored in a given length of track. Increasing this linear bit density again increases the overall capacity of a given amount of medium area to store data. Here too, it usually is economic to increase the linear bit density to what the state of the art allows, since this results in reduced costs for storage of a given amount of data.

It is also necessary to accurately control the gap length, since gap length interrelates with the other dimensions and parameters of the medium, so that deviations from the design gap length can adversely affect performance. For example, incorrect gap length can substantially affect the flux pattern created during writing or the electrical signal generated during reading, causing data to be read incorrectly.

Control of gap length has always been a difficult problem because of the small dimension involved. It is now customary to make the gap on the order of 20 $\mu$ inches (about 0.5 $\mu$) long, and reliably reproducing such a small dimension in a manufacturing process is very difficult. The tolerances are now typically held to $\pm 5$ $\mu$ in. ($\pm 0.1$ $\mu$). In particular, where the I and C bars must be bonded with the gap lengths controlled to within say 15–25 $\mu$ in. over perhaps 50 to 100 core widths or 1 in., it is virtually certain that using current technology, much of the length along the assembled bar will have improper gap length. This occurs for two reasons. In the first place, the two bars may have gap face areas which have not been machined to interface within just a few $\mu$ inches of perfect contact along the entire length of the gap faces. This arises from unavoidable flaws in the lapping process which is intended to produce perfectly flat gap face areas on the I and C bars. Secondly, clamping with conventional point contact clamps and then heating in the bonding step allows the individual bars to distort such that even initially perfect and uniform contact becomes incorrect. In either case, many of the individual cores which are later cut from the bars will have gaps with improper lengths, or the bonding between the gap material and the ferrite will be imperfect. These cores must be scrapped, since there is no way to correct these flaws. Thus it can be seen that current processes result in large numbers of defective cores which must be scrapped. Although there is not a great amount of the total cost of a finished head expended at this stage of the manufacturing process, it is much preferable to have high yield at this, and each, step of the process, since the likelihood of defective parts slipping through the inspection process after the step is done is reduced substantially whenever the process has only a small fraction of defective parts to begin with. In fact with sufficiently high yields, individual inspection of the parts after every step is unnecessary. And regardless of the cost of individual parts at even an early stage of the process, the defects still are an expense.

There are a number of different ways in which the gap may be formed in a manufacturing process. In one process, the I and C bars are positioned so that the spacing between them is equal to the desired gap length. Molten glass is then applied to the gap so that capillary action draws the glass into the gap simultaneously forming the gap and bonding the I and C bars. Another way involves placing a glass foil between the I and C bars to define the gap, and then heating the assembly and applying mechanical pressure to it to melt the glass and bond the bars mechanically. Yet another way is to place a glaze paste on the gap faces of the I and C bars and then fuse the paste to the gap faces with heat to form the gap. Another process uses a nonmagnetic and abrasion-resistant layer to define the gap and then places a bonding material in the form of a thin cane or wire at the inner line of the gap within the I and C bar assembly. Heat is then used to fuse or bond the bonding material to the I and C bars. U.S. Pat. Nos. 3,452,430; 3,550,264; 3,395,450; 3,375,575; 3,024,318; 3,117,367; 4,536,270; 3,233,308; 3,246,383; 3,767,497 and 3,333,332 disclose these processes with a number of variations. In all of these processes, the inability to accurately control the viscosity of the glass gap material by control of the temperature, and the variation of the pressure along the I and C bar interface during bonding results in gap lengths which are difficult to control sufficiently to achieve high yields.

The later approach, as was briefly mentioned earlier, forms the gap from alumina rather than a glass layer. Alumina being very hard, is fully the equal of glass as far as resistance to erosion and undercutting during machining or abrasive contact in use. But alumina has the additional advantage of chemical and mechanical stability during the relatively high temperature bonding process. Glass tends to flow under pressure and heat, and with the extremely short gap lengths involved, results in extremely variable gap lengths whereas alumina is much more stable. The alumina gap material is sputtered onto one or both gap faces of the I and C bars, as is explained in U.S. Pat. No. 4,536,270. Sputtering is inherently capable of depositing very accurate, uniform and repeatable layer thicknesses. When formed by sputtering, alumina layers, or layers of any material for that matter, are strongly adherent and completely conform to the substrate surface.

The present conventional processes then use a thin layer of bonding glass sputtered on at least one of the surfaces to be joined, and the I and C bars properly juxtaposed and subjected to heat and pressure to complete the bond. Unfortunately, to bond alumina requires relatively high temperature, leading to dissolving of the ferrite by the bonding glass, and an indeterminate gap length. However, avoiding this problem by use of very thin layers of glass as the bonding agent between the alumina and the other face makes it difficult to assure that solid bonding occurs along the entire length of the bars because of the hardness of the alumina. This is because of unavoidable spacing variations or voids between the two faces at which the bonding occurs due to deviations from perfect flatness resulting from mechanical and thermal stresses and imperfections in the lapping process preventing precise flatness of the surfaces to begin with. However, the mechanical rigidity of the alumina prevents its flowing to fill the voids between the bonding faces as does glass, in effect substituting one disadvantage for another.

As a general observation, it is desirable to effect the conventional core assembly process with as low temperatures as possible to avoid the possibility of damaging the magnetic properties of the ferrite or causing mechanical damage through thermal stress. This also reduces the magnitude of reaction between the ferrite and any adjacent dissimilar material. It is known that core bonding at relatively low temperature can be done by increasing the pressure between the faces of the parts at the bonding interface of the parts to be joined. This is called diffusion bonding or thermal compression bonding. Such processes are described in U.S. Pat. No. 3,672,045 and in IBM Technical Disclosure Bulletins Vol. 20, No. 10, March 1978, p. 4088, by Daniels et al., "Diffusion Bonding of Dissimilar Ceramics"; Vol. 21, No. 6, November 1978, pp. 2212-2213 by Kehr et al., "Ferrite-Ferrite Diffusion-Bonded Recording Head"; and Vol. 24, No. 3, August 1981, p. 1496 by Chow et al., "Diffusion Bonding Fixture".

However, it is difficult to cause the individual surfaces of a pair of ferrite bars to intimately contact each other along the entire length of their bonding interface, and if there is not this intimate contact the bond is faulty. A solution to this problem is provided in IEEE Transactions on Magnetics, Vol. MAG-20, No. 5, September 1984, pp. 1503-1505 by Rigby, "Diffusion Bonding of NiZn Ferrite and Nonmagnetic Materials", where a what will be hereafter referred to as a "granule vise" is described. By burying a pair of ferrite bars with their surfaces to be bonded juxtaposed, in a volume of hard, heat resistant granules contained in a cylinder bore and then powerfully compressing the granules with a piston driven into the bore, the bars are strongly forced against each other. By applying heat to the bars after thus compressing them against each other, high quality diffusion bonding can be effected along the entire length of the bonding surface of the bars.

BRIEF DESCRIPTION OF THE INVENTION

Some of the described problems of variable gap length in present ferrite core manufacturing processes can be overcome by using the technical advances described above in combination with a unique design for the ferrite bars to be bonded. We have found that the problem of variable gap length along the length of the bar can be solved by forming the bond at a joint between the I and C bar ferrite pieces within magnetic material of the C bar or the I bar rather than at a gap face or within the gap. This allows the use of highly accurate sputtering to set the gap length. Errors which occur in the final length of the magnetic material where the bonding occurs adjacent the gap have no effect on the magnetic performance of the core. Of course, there can be no voids in this area, or a second flux gap will occur, resulting in poor magnetic performance.

The process of this invention involves first depositing a hard non-magnetic layer such as alumina to form the flux gap, on either the I or C bar ferrite piece flux gap face. Then a layer of magnetic material bondable to ferrite through the application of heat and pressure above predetermined levels (diffusion bonding) is deposited onto the hard, non-magnetic gap material. The face of the other bar at which the bond will occur then becomes simply a bonding interface area rather than functioning as a face on one of the bars which defines the flux gap. After the ferrite pieces are mated with the bonding interface area of the one ferrite piece in facing and juxtaposed position with the face of the deposited magnetic material layer, clamping pressure of at least the predetermined level is applied to the two ferrite pieces so as to clamp the bonding interface area and the deposited magnetic material face against each other. While so clamping the ferrite pieces, the bonding interface area and the layer of sputtered magnetic material adjacent to the joint face are heated to at least the predetermined bonding temperature to thereby bond the deposited magnetic material to the other ferrite piece at the bonding interface area.

Sputtering to form these layers is preferred because they allow very accurate control of thickness of the layer, and sputtered layers are strongly adherent to the substrate surface. But is possible that other deposition techniques may eventually prove superior to sputtering.

One potential problem with this process is that because at the bonding interface neither the ferrite bar nor the deposited magnetic material flow very much at a temperature below that which can damage the magnetic characteristics of the ferrite, it is difficult to form along the bonding joint a continuous bond which is mechanically strong and has no voids. And to assure mechanical strength and magnetic continuity of the joint along the entire bar, it is necessary for there to be intimate and uniform contact between the I and C bars along the entire length of the joint face. Conventional clamping mechanisms have problems in overcoming small deviations from perfect flatness along the entire bonding interface to generate the specified pressure at all points along the bonding interface. (The term "pressure" as used in this description has its technical meaning of force per unit area.) The use of the granule vise described above allows uniform pressure of the proper level to be applied along the entire bonding interface so as to form a bond which is satisfactory from both mechanical and magnetic standpoints.

It is also possible to use the same process of depositing ferrite on the bonding face where a high permeability insert is placed adjacent the gap to improve head performance. If this high permeability insert is formed of Sendust (iron-silicon-aluminum), it reacts with the ferrite to form alumina at the bonding interface during the high temperature of the bonding. By separating the Sendust with a barrier layer from the ferrite to form the bonding face, this secondary gap of alumina is substantially avoided.

Accordingly, one purpose of the invention described is to accurately control the gap lengths in individual cores.

A further purpose is to form the bonding interface between individual ferrite bars from which head cores are cut, at a place other than at the flux gap.

A third purpose is to allow use of high permeability materials adjacent to the flux gap.

Another purpose is to avoid the need to use temperature which may damage the magnetic material's magnetic properties.

DESCRIPTION OF THE PREFERRED EMBODIMENTS

Figure 1:
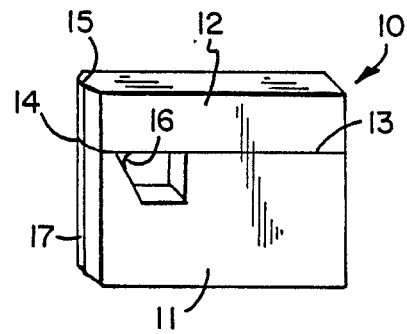
FIG. 1 is a perspective sketch of a conventional ferrite head.

The finished ferrite magnetic transducer head core 10 shown in FIG. 1 and manufactured according to the process of this application is formed of a C core element 11 and an I core element 12 which are bonded adjacent flux gap 14 and back gap 13 within or between magnetic material to form an O-shaped magnetic flux path. The core is typically mounted in a carrier which for a hard disk drive is a flyer, and there is given its final lapping which sets the height of the flux gap. (Height is the vertical dimension of gap 14 in FIG. 1.) The core 10 is shown unmounted for ease of understanding. It is preferred to keep back gap 13 as short as possible to reduce the total magnetic reluctance of the flux path in core 10. Flux gap 14 on the other hand is designed with a preselected length as explained in the Background section of this description and is now typically formed through most of its length from alumina or some other hard non-magnetic material which is stable under high temperature and pressure. (Length of gap 14 is the spacing between the faces of high permeability material defining the sides of the gap.) Core 10 is very small, perhaps a few thousandths of an inch (about 0.1 to 0.2 mm.) thick and less than 0.1 in. (2.5 mm.) in each of its long dimensions.

The transducing surface 17 is in use juxtaposed to a moving recording surface in order to effect reading and writing of the data or other information. It is the usual practice to chamfer the edges of transducing surface 17 as shown in order to reduce the width of the flux gap 14 in the vicinity of the medium and allow increased density of information storage without substantially increasing the reluctance of the flux path. Each turn of the winding eventually added passes through window 15 as is of course well known.

Figure 2:
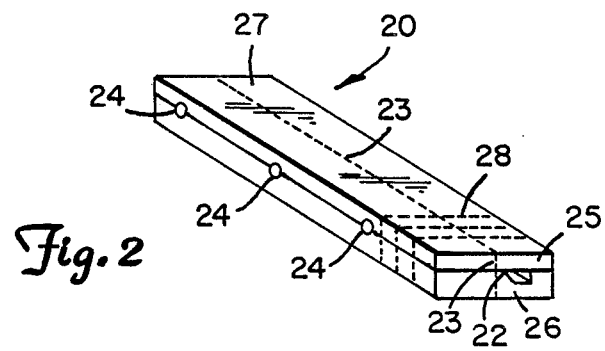
FIG. 2 is a perspective sketch of ferrite C and I bars aligned for bonding.

During the manufacturing process, each core 10 is initially a part of an O bar 20 shown in FIG. 2 whose assembly by bonding a C bar 26 to an I bar 25 is the subject of the invention. Individual core 10 elements are shown in FIG. 2 separated by dotted line kerfs 28 which indicate where a saw will cut to form the individual cores 10. Dotted lines 23 indicate where a rough cut of the O bar 20 occurring before the individual cores are cut from O bar 20 places the gap height for the individual cores 10 near the final value. The C bar 26 is bonded to the I bar 25 at the back gap interface 23 and, in a critical deviation from previous practice, adjacent to, rather than at the flux gap section 22 itself. Referring again to FIG. 1, the bond in the section of core 10 containing flux gap 14 serving to permanently attach the two core elements 11 and 12 to each other has, when manufactured according to the process to be described, a location other than at an edge surface of or within the flux gap 14 itself.

Our experimentation has clearly shown that given proper levels of temperature and pressure, it is possible to form an acceptable diffusion or thermal compression bond directly between manganese-zinc ferrite (53% $Fe_2O_3$, 30% MnO, and 17% ZnO, all by mol percentage) and any of at least three high permeability magnetic materials commonly used as magnetic core materials, all without exceeding a temperature which may affect the magnetic characteristics of the ferrite. These materials are manganese-zinc ferrite itself, Permalloy, and Sendust. It is reasonable to expect that many other types of magnetic ferrite can also be bonded in this manner, since we believe the phenomenon is not a function of the manganese and zinc in the mixture. Thus, many types of magnetic ferrite can, at a temperature low enough to prevent decomposition of the ferrite, be bonded to a similar ferrite without any additional bonding agent. It has been our experience, however, that alumina will not form a bond with ferrite at any temperature below the decomposition temperature of ferrite. Therefore, it is not possible to bond alumina directly to ferrite, giving rise to the approach of this invention where the bond is made between magnetic material sputtered on the sputtered alumina, and a ferrite bar surface.

However, because of the dimensional stability (resistance to softening) of such materials as ferrite and Sendust at temperatures which are low enough to leave the magnetic characteristics of these materials unaffected, to assure that there are no voids in the final bond interface which may act as a secondary flux gap it is necessary to create high, uniform contact pressure at all points along the entire length of the bonding interface. The solution to this problem is the use of the granule clamp described above.

To further mechanically strengthen the bond between the cores, it is preferable to melt a glass cane or rod 16 as shown in FIG. 1 in the fillet area of O bar 20 (FIG. 2) adjacent to flux gap interface 22 before the bonding operation to provide filler material.

Figure 3:
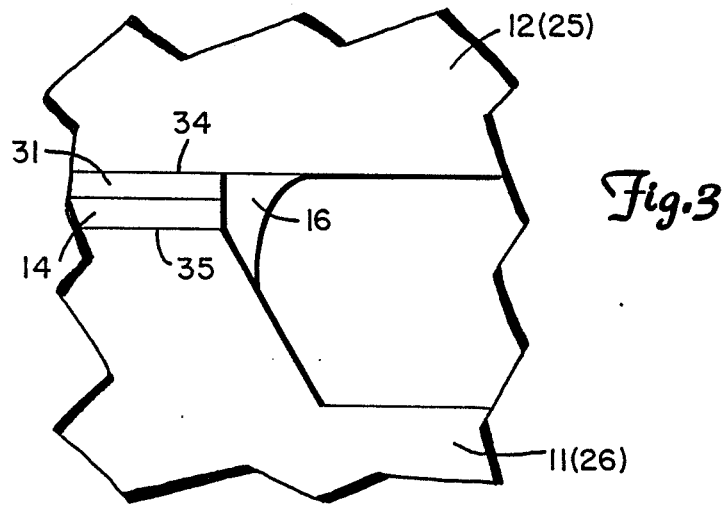
FIG. 3 is a detail plan view of a head core's flux gap area including a ferrite or Permalloy insert.
Figure 4:
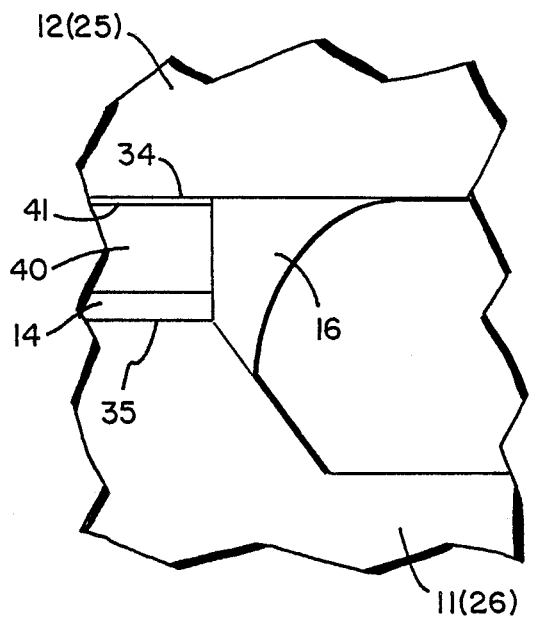
FIG. 4 is a detail plan view of a head core's flux gap area including a high permeability insert and a barrier insert.

FIGS. 3 and 4 detail in plan view the core structure adjacent flux gap 14, including magnetic layer 31, and may be considered to show either a section view of the area adjacent gap 14 of core 10 in FIG. 1 or adjacent gap interface 22 of O bar 20 in FIG. 2. C bar 26 and I bar 25 in FIG. 3 are thus the pictorial equivalent of C core 11 and I core 12 in FIG. 1. Layer 31 in FIG. 3 comprises a short (on the order of 20 to 40 $\mu$ in.) layer of ferrite or Permalloy which is sputtered onto the alumina layer 14 which serves as the flux gap. In FIG. 4, a high permeability layer 40 may be chosen from a material such as Sendust having higher permeability than ferrite, and will then act in a known manner to concentrate the magnetic flux during writing to allow the magnetic head of which core 10 forms a part to be used with the desirable higher coercivity recording media. A suitable length for a layer 40 made from Sendust for flux concentration can range from 100 to 150 $\mu$ in. It is preferable to also place a short (i.e. thin) layer 41 of barrier material on the Sendust to prevent the formation of alumina in the vicinity of face 34 of I core 12, which alumina may function as a secondary gap which will distort the signal during readback. Layer 41 may be from 2 to 4 $\mu$ ins. long.

To perform the gap forming and core element bonding operation, C bar 26 is placed in a sputtering chamber and a layer of alumina is sputter deposited to a depth of approximately 20 $\mu$ in. (0.5 $\mu$) on the gap face 35 of the C bar 26 corresponding to the flux gap face area of the C core 15. The importance of shielding the back gap area 23 of I bar 25 to prevent any alumina from being deposited on it which will increase the reluctance of the finished cores 10 is well known. Sputtering is the preferred means of depositing the alumina because, as explained earlier, it forms a layer of precise thickness which tightly adheres to the substrate surface. Sputtering also allows easy control of the quality of the deposited material and the process is inherently suited to production of a large number of individual pieces.

A layer of magnetic material 31 or 40 is then deposited, preferably by sputtering, onto the alumina layer 14 to the depth specified. When high permeability Sendust is used as a flux-enhancing layer then the barrier material as a third layer 41 is sputtered to the stated depth of approximately 2–4 $\mu$ in. (0.05–0.1 $\mu$) on the high permeability Sendust layer. This barrier layer may be Permalloy or even a non-magnetic material such as silicon nitride, silicon dioxide, or titanium. Since the barrier layer is so thin, it does not appreciably affect the electrical performance of the core 10. Thus, any of these low permeability materials may be considered to have high permeability when sputtered on Sendust in the very thin layers specified.

After the layers in the gap interface 22 are deposited as just described, the C bar is juxtaposed to the bonding interface area 34 on I bar 25 in the position shown in FIG. 2 using an assembly jig whose design is not relevant to the invention here. To maintain the correct positional relationship between the C and I bars 26 and 25 after being so juxtaposed, temporary adhesive patches 24 shown in FIG. 2 may be used to attach the bars to each other. This adhesive may be any kind which is vaporized by temperatures at which the permanent bonding of the C and I bars 26 and 25 to each other occurs. Cyanoacrylates, known popularly as "superglues" are preferred.

Figure 5:
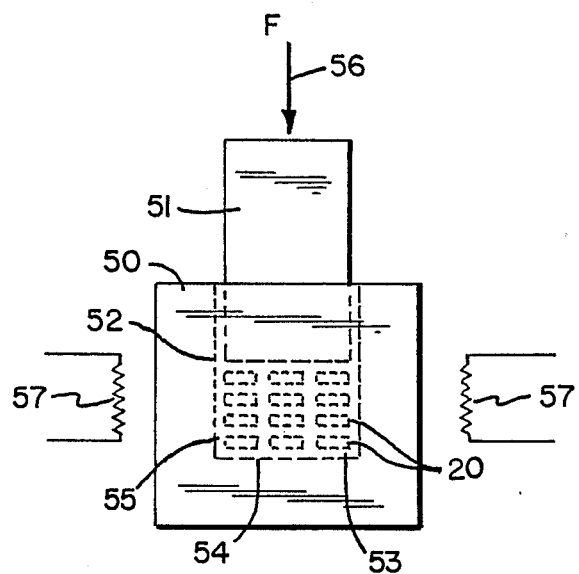
FIG. 5 is a schematic view of a granule vise or clamp for use in bonding ferrite cores.

Once the C and I bars 26 and 25 have been bonded temporarily to each other, the permanent bonding steps can begin. As mentioned earlier, it is necessary to apply large uniform clamping pressure along the entire gap interface 22 of O bar 20 during the time the actual bond is formed. To accomplish this, the granule clamp or vise shown in FIG. 5 is used. This clamp includes a strong cylinder block 50 having side walls 52 and a bottom 54 defining a cylindrical cavity 55 open at its top and at least partly filled with a quantity of hard, heat-resistant granules 53. A pressure die or piston 51 has an external shape conforming to the internal shape of cavity 55, and slides with a small clearance from walls 52 along the axis of and within cavity 55. Block 50 and die 51 may be made from silicon carbide or other hard, heat-resistant material, and the granules 53 may be a heat resistant ceramic approximately 0.05 to 0.08 in. (1.25 to 2 mm.) in maximum dimension. Pressure means for generating force on piston 51 are shown schematically by force vector 56, and may comprise a mechanical jack or other device. Heaters 57 are placed adjacent block 50 and are able to raise the temperature of the granules 53 to at least 500° C. or so.

A number of assembled O bars 20 with the temporary adhesive patches 24 holding the I and C bars 25 and 26 together as shown in FIG. 2 are completely embedded in the granules 53 as shown. The O bars 20 should preferably be oriented with the plane of flux gap interface 22 normal to the axis of cavity 55.

To use the granule clamp, the bottom of the cavity 55 is covered with a thin layer of granules 53. A number of 0 bars 20 held together with temporary adhesive, or other workpieces to be clamped, are laid on the granule 53 surface, and are covered with more granules 53. More workpieces can be added to the cavity 55 and in turn covered with granules 53, until the capacity of the cavity 55 is reached. After all the O bars 20 are in place and covered with granules, the die 51 is inserted in the cavity. Then the compressing means is activated to drive die 51 into the granules 53. The amount of force which must be exerted on the surface of granules 53 is dependent on the amount of pressure required at the outer surfaces of the O bars 20. (Pressure is used in the technical sense of force per unit area.) Essentially the pressure which die 51 imposes on the granules 53 equal the pressure desired on the O bars 20. For example, if the desired pressure on the O bars 20 is 100 psi. and the area of the opening in cavity 55 is 50 in.$^2$, then the pressure means must exert 5,000 lbs. force on die 51. Because the pressure exerted by the die 51 is transmitted isostatically throughout the granules 53 in the cavity 55, pressure at the surface of the granules 53 is identical to that everywhere the cavity where granules are present. Because of the friction between individual granules however, horizontal forces (as viewed in FIG. 5) exerted by the granules may be less than the vertical forces. Thus, for consistent results in terms of bonding pressure from one batch of bars 20 to another and from one bar 20 to another within a single batch, the orientation of the flux gap interface 22 normal to the axis of cavity 55 is preferred.

If the area of I bar 25 within the window of O bar 20 as shown in FIG. 2 is a substantial percentage of the total contact area of the I bar 25 to the C bar 26, it is necessary reduce the force applied to die 51 by the ratio of the total contact area to the outside area of surface 27 of I bar 21. Where there is a relatively wide range allowed for bonding pressure and the area of I bar 25 within the window or opening in the bar 20 is only a small percentage of the total area of the bar's end face, this correction may be ignored.

It turns out that the granule clamp of FIG. 5 has the capability to create very uniform high pressure at the gap interface 22 along the entire length of O bar 20. That is, the force per unit area at all points along the gap interface 22 is very nearly constant as a function of position. Furthermore, this pressure can be varied from one type of workpiece to another, or even changed during a single process step if desirable. Of course, if there are a number of workpieces in a single clamp, the pressure changes are created for all of the workpieces simultaneously.

In the specific process developed to bond ferrite 0 bars 20, after the individual bars have been placed in the granule clamp of FIG. 5 as explained, a slight preload of a few psi. is imposed on the die 51 to prevent any shifting of the individual bars within the granules 53. The heaters 57 are turned on and the bars 20 are brought to the bonding temperature. After the bonding temperature is reached, then the pressure is applied to die 51 by the compression means for about 15–30 minutes. After the time has elapsed, the pressure is reduced to the preload value and the bars 20 allowed to cool. It is necessary to apply the bonding pressure after the bars 20 have been heated to the bonding temperature to prevent cracking. It is also difficult to maintain the required pressure on the die 51 when the temperature of the granules 53 is changing and the granules are therefore thermally expanding.

This process results in great success in accurately maintaining flux gap length while bonding I bars 25 to C bars 26. This makes the process described very cost effective.

While the process described above provides that the gap material is sputtered on face 35 of C bar 26, it is also possible to sputter the gap material on face 34 I bar 25, and then bond between the high permeability material layer and C bar face 35. There are some limitations, however. When a Sendust layer 40 is deposited, this must trail the gap 14 with respect to the moving medium in order to make full use of the high permeability. It is the usual practice for the I core 12 to trail the C core 11, so if this relationship will exist, then the relationship between the individual layers must be as shown. However, if Permalloy or ferrite is used for layer 31, then the gap material may be sputtered on either the I bar 25 or the C bar 26, the high permeability material sputtered on the gap material, and then the bonding effected between the high permeability layer 31 and the C bar 26.

Figure 6:
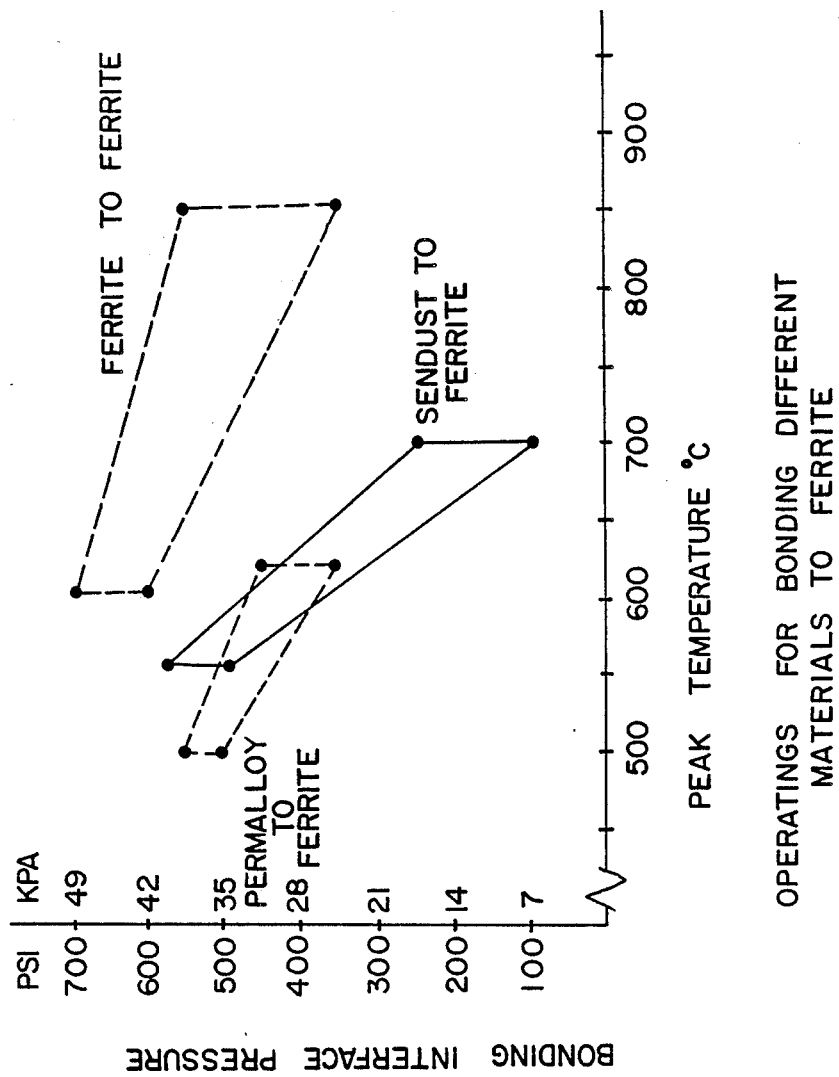
FIG. 6 is a graph of the operating ranges for temperature and pressure necessary to form acceptable bonds between the specified materials.

It is also necessary to state the exact or preferred ranges of temperature and pressure necessary to effect high quality bonding. In FIG. 6, the three areas within the closed curves shown specify the ranges as measured at the bonding interface of the bars 20, for temperature and pressure required for forming satisfactory bonds in a manganese zinc ferrite magnetic head, between the different combinations of interface materials stated. Not every point at the periphery of the individual areas has been tested, but the range is, based on substantial experimentation and best engineering judgment, believed to be accurate. However, not every point at the edges of the ranges may be fully satisfactory at the time duration specified. Conversely, it should also be noted that certain parts of these ranges may be conservative, and satisfactory bonding may occur outside the applicable curve. The pressure specified in FIG. 6 is that actually generated at the interface, and if the interface pressure differs substantially from the pressure measured at the face of piston 41, must be corrected as described above. The time for maintaining these conditions necessary for satisfactory results is on the order of 15–30 minutes as explained in the description of the bonding process. These ranges are also subject to variations from batch to batch of a given pair of materials as a result of variations in the shape or chemical makeup of the materials involved or in the surface geometry at the bonding interface. In this respect note that even within the family of ferrite materials, there are a large number of variations in structure and constituents, some deliberately created for varied magnetic or mechanical properties, and others accidental or simply inexplicable, which may well cause variations in bonding activity. That is, different ferrite, Sendust, or Permalloy materials may well react to this bonding process differently. Thus, a small amount of experimentation within or close to the ranges shown may be required to optimize a particular operation.

These ranges are quite wide and the powder vise described above efficiently and uniformly transmits pressure (and allows good heat transfer) to all of the workpieces involved in a single compression or clamping episode. This means that when simultaneously clamping a number of ferrite head bar workpieces during a bonding process using this powder vise, maintaining every workpiece well within any of the specified ranges is easy to do.

The ranges shown in FIG. 6 can be stated verbally as follows: For ferrite to Sendust bonds, the pressure and temperature should be maintained within or close to the range defined by, on the pressure versus temperature graph of FIG. 6, a closed curve comprising a quadrilateral shape having corners at about: 500 psi. (35.2) and 550° C., 575 psi. (40.5) and 550° C., 250 psi. (17.6) and 700° C., and 100 psi. (7) and 700° C., where values in parentheses are in kilopascals. For ferrite to ferrite bonds the pressure and temperature should be maintained within or close to the range defined by, on the pressure versus temperature graph of FIG. 6, a closed curve comprising a quadrilateral shape having corners at about 600 psi. (42.2) and 600° C., 600 psi. (42.2) and 700° C., 550 psi. (38.7) and 850° C., and 350 psi. (24.6) and 850° C. For ferrite to Permalloy bonds the pressure and temperature should be maintained within or close to the range defined by, on the pressure versus temperature graph of FIG. 6, a quadrilateral shape having corners at about 500 psi. (35.2) and 500° C., 550 psi. (38.7) and 500° C., 450 psi. (31.7) and 625° C., and 350 psi. (24.6) and 625° C.

The increased yield in the bonding step where the individual bars are formed, reduces the likelihood that post-bonding inspection will allow defective bars through to the sawing steps where the individual cores are formed. Thus, the advantage of this invention is not merely that the yield is increased at this relatively early stage in the process, but also lies in a substantially improved yield at later stages as well, because the likelihood of defective cores infecting the subsequent steps in the process is reduced.

The preceding has described our invention.

What we desire to protect by Letters Patent is:

1. A method for construction of a ferrite magnetic head core having a flux gap in the magnetic flux path thereof, said head core to be cut from an O bar comprising a first ferrite piece having a bonding interface area and a second ferrite piece having a flux gap face thereon which can be aligned with the bonding interface area of the first ferrite piece to form the O bar, comprising the steps of:

(a) depositing a hard non-magnetic layer on the second ferrite piece's flux gap face; then
   (b) depositing on the hard non-magnetic material a magnetic material bondable to ferrite through the application of heat and pressure above predetermined levels; then
   (c) mating the two ferrite pieces with the magnetic material and the first ferrite piece's bonding interface area in facing and juxtaposed position;
   (d) applying clamping pressure of at least the predetermined level to the ferrite pieces so as to clamp the two ferrite pieces with the bonding interface area and the deposited magnetic material face against each other; and
   (e) while so clamping the ferrite pieces, heating the bonding interface area and the layer of deposited magnetic material adjacent to the bonding interface area to at least the predetermined bonding temperature to thereby bond the deposited magnetic material and the bonding interface area to each other.

2. The head core construction method of claim 1, wherein the magnetic material depositing step includes sputtering magnetic Fe-Si-Al alloy as the magnetic material, wherein the clamping step includes creating clamping pressure along the first ferrite piece's bonding interface area of at least about 350 psi., and wherein the heating step includes heating the first ferrite piece's joint face to at least 500° C.

3. The head core construction method of claim 2, wherein the pressure and temperature is maintained within the range defined by, on a pressure versus temperature graph, a quadrilateral shape having corners at about: 500 psi. and 550° C., 575 psi. and 550° C., 250 psi. and 700° C., and 100 psi. and 700° C.

4. The head core construction method of claim 1, wherein the magnetic material sputtering step includes sputtering ferrite as the magnetic material, wherein the clamping step includes creating clamping pressure along the first ferrite piece's joint face of at least about 350 psi., and wherein the heating step includes heating the first ferrite piece's joint face to at least 600° C.

5. The head core construction method of claim 4, wherein the pressure and temperature is maintained within the range defined by, on a pressure versus temperature graph, a quadrilateral shape having corners at about: 600 psi. and 600° C., 600 psi. and 70020 C., 550 psi. and 850° C.; and 350 psi. and 850° C.

6. The head core construction method of claim 1, wherein the magnetic material sputtering step includes sputtering nickel-iron alloy as the magnetic material, wherein the clamping step includes creating clamping pressure along the first ferrite piece's joint face of at least about 500 psi., and wherein the heating step includes heating the first ferrite piece's joint face to at least 500° C.

7. The head core construction method of claim 6, wherein the pressure and temperature is maintained within the range defined by, on a pressure versus temperature graph, a quadrilateral figure having corners at about: 500 psi. and 500° C., 550 psi. and 50020 C., 450 psi. and 625° C.; and 350 psi. and 625° C.

* * * * *

UNITED STATES PATENT AND TRADEMARK OFFICE
CERTIFICATE OF CORRECTION

PATENT NO. : 4,942,658
DATED : July 24, 1990
INVENTOR(S) : Vadnais, et al It is certified that error appears in the above-identified patent and that said Letters Patent is hereby corrected as shown below:

On the title page, item (19) should read "Vadnais, et al".

(75) Inventors: Timothy W. Vandnais should read
--Timothy W. Vadnais--.

(57) Abstract, line 9, should read "below a point which may affect the ferrite"s magnetic."

Signed and Sealed this

Seventh Day of January, 1992

Attest:

HARRY F. MANBECK, JR.

*Attesting Officer*  *Commissioner of Patents and Trademarks*